United States Patent
Kurz et al.

(10) Patent No.: US 11,434,963 B2
(45) Date of Patent: Sep. 6, 2022

(54) BRAKE SYSTEM DAMPING DEVICE WITH A PASSAGE IN A SEPARATING ELEMENT

(71) Applicant: Robert Bosch GmbH, Stuttgart (DE)

(72) Inventors: Edgar Kurz, Heilbronn-Horkheim (DE); Wolfgang Schuller, Cleebronn (DE)

(73) Assignee: Robert Bosch GmbH, Stuttgart (DE)

( * ) Notice: Subject to any disclaimer, the term of this patent is extended or adjusted under 35 U.S.C. 154(b) by 53 days.

(21) Appl. No.: 16/994,912

(22) Filed: Aug. 17, 2020

(65) Prior Publication Data
US 2021/0054890 A1 Feb. 25, 2021

(30) Foreign Application Priority Data
Aug. 19, 2019 (DE) ............. 10 2019 212 350.3

(51) Int. Cl.
*B60T 17/04* (2006.01)
*F16D 65/00* (2006.01)
*F16L 55/04* (2006.01)
*B60T 8/40* (2006.01)
*F16F 9/04* (2006.01)

(52) U.S. Cl.
CPC ........ *F16D 65/0006* (2013.01); *B60T 8/4068* (2013.01); *B60T 17/04* (2013.01); *F16F 9/04* (2013.01); *F16L 55/04* (2013.01)

(58) Field of Classification Search
CPC . B60T 8/4068; F16F 9/049; F16F 9/04; F16F 9/0436; F16F 9/0481; F16L 55/04; F16L 55/041
See application file for complete search history.

(56) References Cited

U.S. PATENT DOCUMENTS 5,335,984 A * 8/1994 Alaze ............... B60T 8/363
137/596.17
9,234,531 B2 * 1/2016 Wald ................ B60T 17/04
(Continued)

FOREIGN PATENT DOCUMENTS

DE 19948444 B4 * 5/2007 ............. B60T 8/4068
WO WO-0181812 A1 * 11/2001 ............. F16L 55/053

OTHER PUBLICATIONS

Machine translation of DE-19948444 (no date).*
Machine translation of WO-0181812 (no date).*

*Primary Examiner* — Nicholas J Lane
(74) *Attorney, Agent, or Firm* — Maginot, Moore & Beck LLP

(57) ABSTRACT

A brake system damping device includes a first space, a second space, a third space, a first separating element, a second separating element, a closure element, and a plug-type element. The first space is configured to have hydraulic pressure applied thereto. A compressible medium is situated in the second space and the third space. The first separating element separates the first space from the second space, and the second separating element separates the second space from the third space. The second space is connected in medium-conducting fashion to the third space by a passage formed in the second separating element. The closure element is configured to be moved with the first separating element so as to close the passage in a movement direction as soon as the hydraulic pressure has reached a predefined pressure value in the first space. The plug-type element is arranged in the passage.

14 Claims, 4 Drawing Sheets

(56) References Cited

U.S. PATENT DOCUMENTS

| | | | |
|---|---|---|---|
| 2019/0344766 A1* | 11/2019 | Kurz | B60T 8/4291 |
| 2020/0386291 A1* | 12/2020 | Kurz | F16L 55/053 |
| 2021/0018053 A1* | 1/2021 | Kurz | B60T 17/22 |
| 2021/0054890 A1* | 2/2021 | Kurz | F16L 55/053 |

* cited by examiner

BRAKE SYSTEM DAMPING DEVICE WITH A PASSAGE IN A SEPARATING ELEMENT

This application claims priority under 35 U.S.C. § 119 to patent application no. DE 10 2019 212 350.3, filed on Aug. 19, 2019 in Germany, the disclosure of which is incorporated herein by reference in its entirety.

BACKGROUND

The disclosure relates to a brake system damping device having a first space, to which hydraulic pressure is to be applied, and having a second space, in which a compressible medium is situated. A first separating element serves for separating the first space from the second space. Furthermore, the brake system damping device has a third space, in which a compressible medium is situated, and a second separating element for separating the second space from the third space. Here the second space is connected in medium-conducting fashion to the third space by means of a passage formed in the second separating element, and a closure element is provided for being moved with the first separating element, which closure element serves for closing the passage in a movement direction as soon as the hydraulic pressure has reached a predefined pressure value in the first space.

Brake systems, in particular hydraulic brake systems, serve for decelerating a travelling speed of vehicles, for example passenger motor vehicles and heavy goods vehicles. During the operation of such brake systems, various dynamic effects arise, inter alia pressure fluctuations in lines and spaces present there, which pressure fluctuations lead to oscillations or pulsations and thus to undesired noises and vibrations. To minimize such oscillations, or achieve a damping effect in the case of these oscillations, brake system damping devices, hereinafter also referred to as dampers, are used at one or more installation locations in the brake system. These dampers comprise a first space, which is provided for having a hydraulic pressure applied therein. The space is basically a type of container. The pressure is basically the result of a force acting on a surface. In the dampers, a force is transmitted hydraulically, that is to say via a pressurized liquid.

Dampers are known which have a separating element which separates the space into a first space, in which a liquid or a fluid is situated, and a second space, in which a compressible medium, generally in the form of a gas, is situated. The volume of a space of a deformable container in which a gas is situated decreases, as is known, if an elevated pressure is exerted on said container from the outside. Likewise, by means of the separating element, the volume of the second space also decreases if a hydraulic pressure acts on the first space.

If this pressure is withdrawn again, then the volume of the gas and thus of the second space corresponding also increases again. The second space thus acts in the manner of a pneumatic spring, also referred to as gas spring. The softness or hardness of the damping action of this gas spring is dependent on the gas volume of the second space. The larger the gas volume, the softer the damping.

During a braking process, a vehicle driver depresses a brake pedal which, in the process, covers a pedal travel. This pedal travel is directly related to the gas volume of the second space of relevance here. The larger the gas volume, the longer the pedal travel. The positive effect of soft damping is thus opposed by the negative effect of a large pedal travel length.

The third space, like the second space, contains the compressible medium, which is preferably formed with a gas and particularly preferably with air. The second separating element separates the third from the second space, wherein the two spaces however initially remain connected by means of the medium-conducting passage. The passage, or the connection, is preferably formed with a simple bore, and closable by means of the closure element of the first separating element. Preferably, the closure element is simply a surface region on the surface of the first separating element. Said closure element closes the passage only when a hydraulic pressure sufficient for this prevails in the first space. Specifically, above the predefined pressure value, the first separating element is in particular deformed to such an extent that it then bears against the second separating element. The second separating element thus preferably forms a stop for the closure element.

Owing to the closed passage, the third space is then decoupled from the second space and is thus no longer available to the rest of the damper. For the further damping action above the predefined pressure value, only the medium volume in the second space remains. This is now relatively small owing to the first separating element having been deformed in the direction of the second separating element. Thus, the damper according to the disclosure has only a relatively low remaining elasticity and damping action because the second space can accommodate scarcely any further volume. The effect here is that a pedal travel, or the travel of a brake pedal of the brake system during an actuation by means of a vehicle driver, is no longer significantly lengthened.

Upon closure of the passage, the first separating element may even bear entirely against the inner wall of the second space, including that side of the second separating element which faces toward the second space, such that the second space disappears entirely, or no longer has any volume. Then, above the predefined pressure value, the pedal travel increases no further whatsoever. The damping action which is thus likewise eliminated is acceptable, because the pressure range of relevance for the damping lies below the predefined pressure value.

The pressure value is thus preferably selected or predefined so as to constitute the upper limit value of a pressure range of relevance for the damping. The respective volumes of the second and third space are in this case preferably adapted to the relevant pressure range and to the desired elasticity or damping action of the damper.

In this advantageous manner, the damper combines the high elasticity of the large medium volume in the pressure range of relevance for the damping with a limitation of the volume that can be absorbed by the first space above said pressure range. In other words, there is no longer a direct dependency between the displaced volume of brake medium and the medium volume used for the damping. The damper thus offers excellent damping characteristics with a short pedal travel.

A further advantage is that the pressure in the closed third space is considerably lower than the pressure in the second space would be without a passage to a further space, that is to say in the case of the prior art. Thus, undesired effects are reduced. Firstly, in the case of a relatively low pressure, the permeation through the first separating element is reduced, and secondly, the temperature of the medium in the case of a relatively low pressure is not so high, as a result of which material aging of the first separating element is slowed.

The disclosure is based on the object of designing a device for vibration damping in a brake system of the above-stated type to be producible inexpensively and at the same time to have a long service life.

SUMMARY

According to the disclosure, a brake system damping device is created having a first space, which is provided for having hydraulic pressure applied thereto, and having a second space, in which a compressible medium is situated, and having a first separating element for separating the first space from the second space. The brake system damping device according to the disclosure furthermore has a third space, in which a compressible medium is situated, and a second separating element for separating the second space from the third space, wherein the second space is connected in medium-conducting fashion to the third space by means of a passage formed in the second separating element, and wherein a closure element is provided for being moved with the first separating element, which closure element serves for closing the passage in a movement direction as soon as the hydraulic pressure has reached a predefined pressure value in the first space. According to the disclosure a plug-type element is arranged in the passage.

By means of the plug-type element according to the disclosure, it is possible, at the associated passage, to create a support against which the first separating element, during the movement in the direction of the second separating element, can bear and thereby be supported. In this way, it is possible to prevent the second separating element from being damaged at or in the passage owing to friction or kinking action.

Here, in particular, the plug-type element according to the disclosure is provided for at least partially covering the cross-sectional area of the passage. Here, it is particularly advantageously the case, according to one advantageous refinement, that the plug-type element is, at its side facing toward the second space, formed by means of a convex cap. The convexly, that is to say outwardly, domed cap furthermore contributes to a situation in which the first separating element can bear against said cap, and lift off from said cap, with a rolling movement. With this movement, a situation is simultaneously prevented in which the first separating element could attach to said cap by suction owing to negative pressure. The cap creates a mandrel-like abutment surface for the first separating element, against which the latter can be supported without blocking the associated at least one passage opening. The convex shape of the cap simultaneously contributes to a situation in which the first separating element can bear against said cap without a step or kink edge, and thus in a manner free from kinks.

It is furthermore advantageous, in accordance with the advantages stated above, if the plug-type element is mushroom-shaped and is formed with a mushroom head at its side facing toward the second space. Here, a mushroom head is to be understood to mean an element which is larger in diameter transversely with respect to the longitudinal axis of the plug-type element than the associated mushroom stem, and which is thus in particular also larger than the diameter of the passage which said mushroom stem is provided for being inserted in.

In a further development of the disclosure, the plug-type element is, at its side facing toward the second space, formed with at least one passage opening, the cross-sectional area of which is oriented substantially in the movement direction of the closure element. The passage opening of this type extends not, as is generally conventional, transversely with respect to the movement direction of a closure element which closes it, but substantially in said movement direction. The cross-sectional area thus extends in the direction in which the closure element also moves. It is thus achieved that the closure element cannot bear directly against edges of the passage opening and move into the passage opening itself. Thus, the closure element also cannot become stuck in the passage opening itself or become jammed therein. Instead, the closure element will rather entirely or extensively cover the passage opening and bear against abutment regions which are further remote from the passage opening. Thus, a jamming, or attachment by suction, of the closure element to the passage opening and to the associated passage is reliably prevented, and high operational reliability is established in a simultaneously very inexpensive manner.

The at least one passage opening is preferably formed as a slot. Here, a slot is to be understood to mean an opening area which has a relatively long slot length (of in particular 1 or more millimeters) and a relatively small slot width (of in particular less than 1 millimeter). In the case of the slot of said type, the slot width thereof extends preferably in the movement direction of the closure element. The passage opening of said type can thus be opened and closed by means of a relatively small movement of the closure element. At the same time, with the relatively long slot length, a relatively large cross-sectional area with little flow resistance is available.

Preferably, between two and four, in particular three, passage openings are provided. These are advantageously arranged so as to be distributed over the circumference of a circular cylinder. A plurality, and in particular an odd number, of passage openings creates an irregular flow characteristic through the passage and thus a flow with fewer pressure shocks and pressure fluctuations through the passage according to the disclosure.

The plug-type element according to the disclosure is furthermore advantageously, at its side facing toward the third space, formed with at least one detent hook. The at least one detent hook captively retains the plug-type element in the passage after it has been fitted therein during the installation process.

In one advantageous embodiment, the second separating element is produced from metal, and the plug-type element is produced from plastic. Particularly inexpensive production of the two components is thus possible. At the same time, the two components can be optimally adapted to their functions, specifically, for the second separating element, the support of the first separating element and, for the plug-type element, the prevention of damage to the second separating element at the passage. The plug-type element is produced particularly preferably by means of injection molding. Injection molding, or the injection molding method, is a manufacturing method, more specifically a primary forming method, for producing components. Here, by means of an injection molding machine, the respective plastic is liquefied and is injected under pressure into a mold.

In a next advantageous refinement of the disclosure, the first separating element is formed with a diaphragm, preferably with a rolling diaphragm. Here, diaphragms are basically to be understood as sealing elements which, as elastic, movable separating walls or separating elements, hermetically separate two spaces from one another. Here, rolling diaphragms in particular are provided only for unilateral pressure loading in the direction of a loop inner side or diaphragm head depression. Rolling diaphragms oppose changes in volume with only a negligibly low inherent stiffness or a low resistance to elastic deformation. Rolling diaphragms are thus, owing to their shaping, particularly highly suitable as a separating element for the brake system damping device according to the disclosure.

The first separating element is advantageously produced from an elastomer, preferably from ethylene propylene diene monomer. Elastomers are dimensionally stable but elastically deformable plastics. These plastics can therefore deform under tensile and compressive loading but thereafter return into their original non-deformed shape. Thus, elastomers are particularly highly suitable materials for separating elements in the context of this disclosure, for example for the above-described rolling diaphragm.

The elastomer must maintain its elasticity and must neither swell nor shrink to too great an extent. Therefore, a suitable elastomer must be used for the medium for sealing. Ethylene propylene diene monomer, also referred to for short as EPDM, is an elastomer which is resistant to brake medium and which is therefore particularly suitable for use in the brake system damping device according to the disclosure.

Furthermore, according to the disclosure, the predefined pressure value is advantageously predefined with a value between 0 and 30 bar, preferably between range 3 and 10 bar, and particularly preferably of 5 bar. If a brake system applies a pressure of approximately 60 bar to an associated wheel of a vehicle, this certainly causes a blockage of the wheel. For the vibration or pulsation damping in brake systems, however, only a considerably lower, limited pressure range is of relevance. When a pressure value of approximately 5 bar has been attained, the disturbing vibration or pulsation has already been sufficiently dampened. Therefore, the pressure value should particularly advantageously be set to this value.

It is furthermore preferable for multiple passages to be provided in the second separating element. Said passages ensure a faster redistribution of the medium from the second into the third space during the braking process. In this way, the elasticity of the entire medium volume can be better exploited.

Furthermore, further embodiments are advantageous which make the brake system damping device even more efficient or supplement it with alternative embodiments.

In a further advantageous embodiment, the third space is divided into multiple partial spaces, which are each connected in medium-conducting fashion to the second space by means of a passage. The multiple partial spaces permit higher flexibility in relation to the use of only a single third space. Thus, the passages to the individual partial spaces are closed preferably successively by means of the first separating element, whereby the damping action is decreased in stages, and not fully and suddenly at the one predefined pressure value. Furthermore, by means of closure and reopening of passages, a variable number of partial spaces, and thus a variable medium volume, can be utilized. This facilitates the adaptation of the damper to the relevant pressure range and the desired elasticity.

The compressible medium which is contained in the second and third space is preferably formed as a gas and particularly preferably as air. Air is easily available, can be used and compressed without costs, and is thus extremely highly suited to use in the brake system damping device according to the disclosure.

The medium volume or the second and third space are alternatively and advantageously produced or created by means of a combination of multiple turned, cold-formed or deep-drawn parts. Turned parts are components with a circular cross section, cold-formed parts are closure components, and deep-drawn parts are body components of vehicles. All of these components are thus easy to create in the automotive industry and are provided with a new usage purpose by means of the disclosure.

Furthermore, the brake system damping device is preferably provided for use in driving dynamics regulating systems and/or power-assisted brake systems. A driving dynamics regulating system or electronic stability program, also referred to as ESP, is an electronically controlled driver assistance system for a motor vehicle, which counteracts skidding of the motor vehicle through targeted braking of individual wheels. A power-assisted brake system or a power-assisted brake installation is operated by means of externally generated force. For example, an electrohydraulically actuated brake is a power-assisted brake in the case of which actuation energy originates from a hydraulic pressure accumulator which is charged by a pump.

BRIEF DESCRIPTION OF THE DRAWINGS

Exemplary embodiments of the solution according to the disclosure will be discussed in more detail below on the basis of the appended schematic drawings, in which.

DETAILED DESCRIPTION

Figure 1:
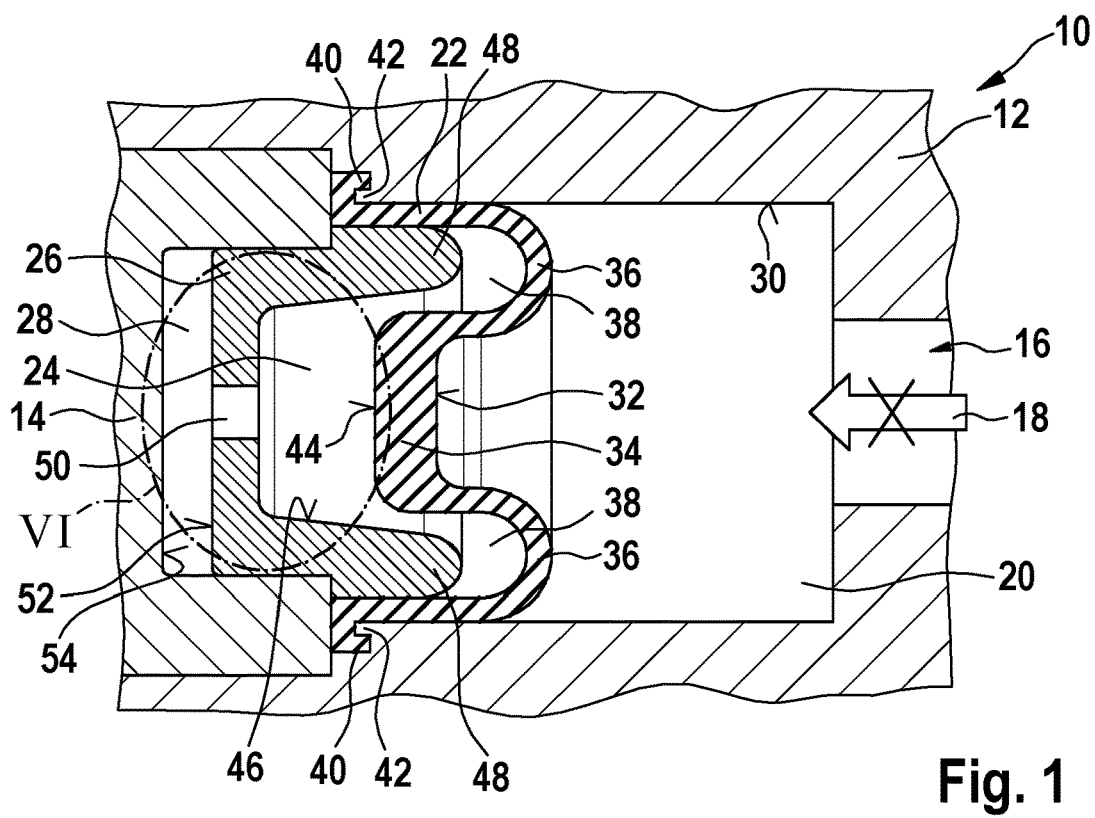
FIG. 1 shows a first example of a brake system damping device such as forms the basis of the disclosure.

FIG. 1 illustrates a brake system damping device 10 with a housing 12 and a cover 14. Arranged in the housing 12 is a feed line 16 in which, in the present case, no hydraulic pressure prevails, as illustrated by means of a struck-through arrow 18. The feed line 16 opens into a first space 20, which is adjoined by a first separating element 22, in this case a rolling diaphragm. Behind the first separating element 22 as viewed from the first space 20, there is situated a second space 24, which is adjoined by a second separating element 26, wherein a third space 28 is situated behind the second separating element 26 in the viewing direction.

In detail, these spaces 20, 24, 28 and separating elements 22, 26 have the following appearance. The first space 20 is surrounded by a housing inner wall 30 and by a first separating element inner wall 32 of the first separating element 22, hereinafter referred to as rolling diaphragm. Arranged centrally in the separating element 22, and formed in one piece therewith, is a closure element 34, from which the separating element 22 extends further outward to a diaphragm fold 36. Within the diaphragm fold 36, or surrounded by this, there is situated a diaphragm fold depression 38. Following the diaphragm fold 36, the separating element 22 extends as far as a diaphragm collar 40, which engages around a coupling socket 42 of the housing 12. The separating element 22 designed as a rolling diaphragm bears by way of a part of its separating element inner wall 32 sealingly against the housing inner wall 30, and faces with a first separating element outer wall 44 toward the second space 24. The second space 24 is surrounded by the first separating element outer wall 44 and by a second separating element inner wall 46 of the second separating element 26.

The second separating element 26 extends with a diaphragm holding device 48 into the diaphragm fold depression 38. Arranged centrally in the second separating element 26 is a passage 50 which connects the second space 24 to the third space 28. Here, the passage 50 leads through the second separating element inner wall 46, the second separating element 26 and a second separating element outer wall 52. The third space 28 is surrounded by the second separating element outer wall 52 and by a cover inner wall 54 of the cover 14.

In the illustrated initial state of the braking system damping device 10, initially no hydraulic pressure 18 prevails in the first space 20, in which a brake medium is situated. The separating element 22, which is produced from an elastomer, is in this case present substantially in its basic shape. Here, it bears against the housing inner wall 30 such that the first space 20 is hermetically sealed off with respect to the second space 24, wherein a gas, in this case specifically air, is situated in the second space 24. Said gas is also situated in the third space 28, which is connected by means of the passage 50 to the second space 24. Thus, these two spaces 24, 28 form a common gas volume which is available for the damping. Owing to the relatively high elasticity of this gas volume, a better damping action is attained during the braking operation or during the application of a hydraulic pressure to the first space 20.

If a hydraulic pressure prevails in the first space 20, the separating element 22 deforms such that the gas volume in the second space 24 decreases in size. Here, the closure element 34 moves into the second space 24. Above a particular hydraulic pressure, which is set above a pressure range of relevance for the damping, the closure element 34 bears against the second separating element inner wall 46 of the second separating element 26 and closes the passage 50 to the third space 28. Here, the second separating element 26 acts as a stop. States of the brake system damping device 10 in which the separating element 22 or the closure element 34 thereof bears against the second separating element 26 and closes the passage 50 are illustrated in FIG. 2 and FIG. 3.

Owing to the closed passage 50, the third space 28 is now separated from the second space 24, whereby only the remaining gas volume in the second space 24 can be used for the further damping. The elasticity and damping action is only low because the second space 24 can accommodate scarcely any further volume. This action is desired because, in this way, the travel of a brake pedal connected to the brake system is also significantly lengthened no further. In the state of the brake system damping device 10 as illustrated in FIG. 3, the separating element 22 and the second separating element 26 bear against one another without a gap or over a full area, such that the second space 24 disappears entirely or no longer has any volume. In this case, the travel of the brake pedal is lengthened no further.

As soon as the hydraulic pressure prevailing in the first space 20 decreases, the separating element 22 moves back into its initial state or its initial position again.

Figure 2:
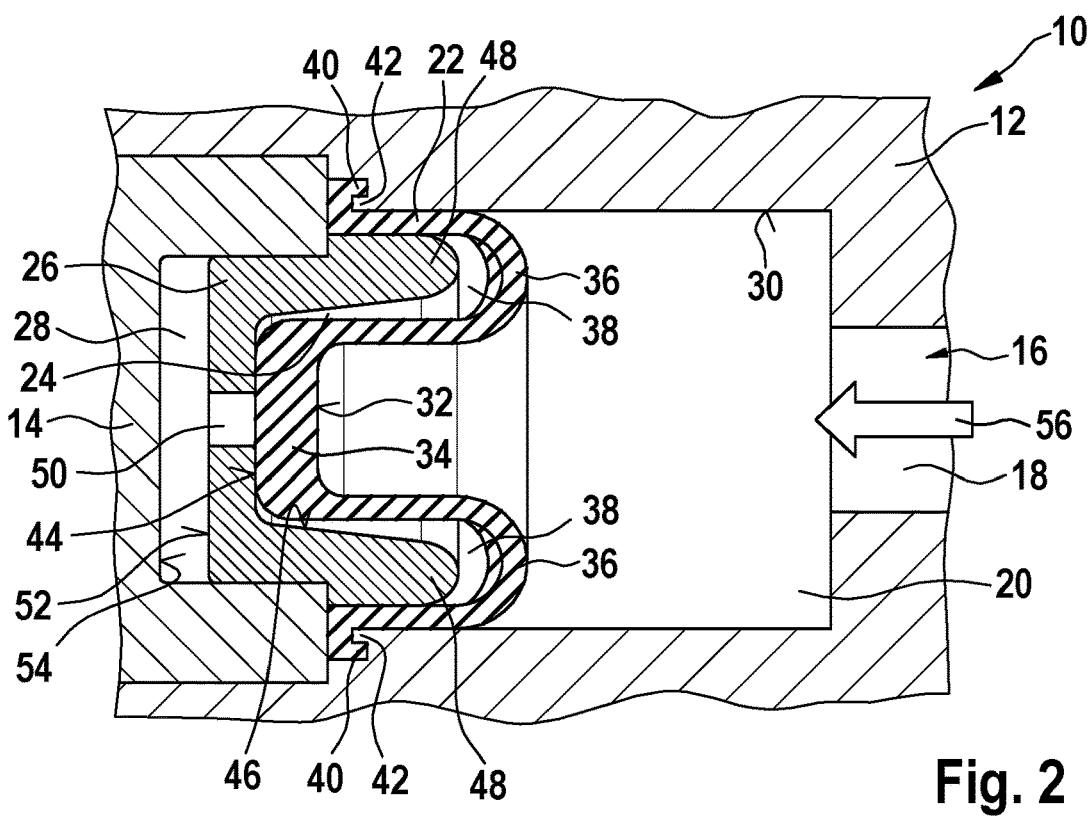
FIG. 2 shows the brake system damping device in FIG. 1 in the case of a first applied hydraulic pressure.
Figure 3:
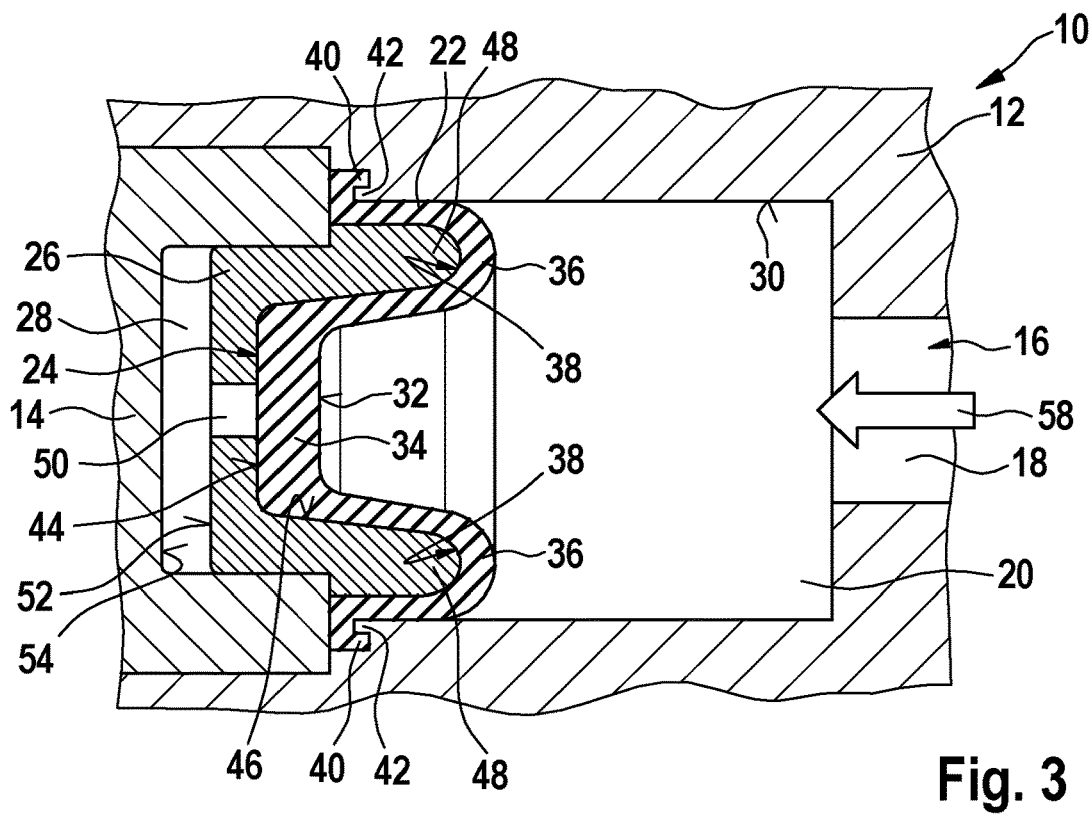
FIG. 3 shows the brake system damping device in FIG. 1 in the case of a second applied hydraulic pressure.

FIG. 2 shows the brake system damping device 10 from FIG. 1, but in a state in which a first hydraulic pressure is applied to the first space 20, as illustrated by means of an arrow 56 in the region of the feed line 16.

As already mentioned, the closure element 34 in this case bears against the second separating element inner wall 46 of the second separating element 26 and closes the passage 50 to the third space 28. Thus, only the remaining volume in the second space 24 can be used for the further damping. In the illustration of FIG. 2, this is primarily the region around the diaphragm holding device 48. The effects on the damping and the braking process have already been discussed in detail in the description relating to FIG. 1, and will therefore not be described again here.

FIG. 3 illustrates the brake system damping device 10 from FIG. 1, but in a state in which a second hydraulic pressure is applied to the first space 20, as illustrated by means of an arrow 58 in the region of the feed line 16.

As already mentioned, the closure element 34 in this case bears against the second separating element inner wall 46 of the second separating element 26 and closes the passage 50 to the third space 28. Furthermore, the separating element 22 and the second separating element 26 bear against one another without a gap, such that the second space 24 no longer has any volume. The associated effects on the damping and the braking process have already been discussed in detail in the description relating to FIG. 1, and will therefore not be described again here.

Figure 4:
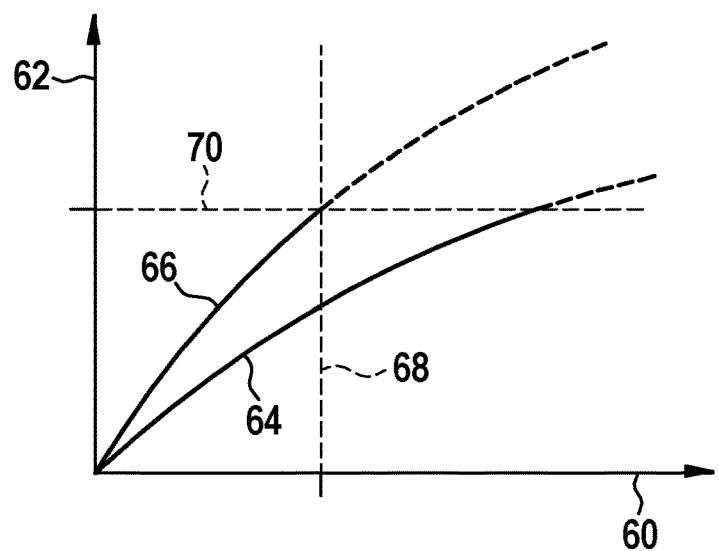
FIG. 4 shows a diagram with characteristic curves relating to the dependency of pressure and volume uptake in brake system damping devices.

FIG. 4 shows a diagram relating to the dependency between a pressure 60 and an volume uptake 62 in such brake system damping devices. Here, the pressure 60 is plotted on the x axis, and the volume uptake 62 is plotted on the y axis. A first characteristic curve 64 and a second characteristic curve 66 extend proceeding from a coordinate origin of the diagram. Furthermore, the diagram shows a vertical dashed line 68 crossing the x axis and a horizontal dashed line 70 crossing the y axis.

The first characteristic curve 64 shows the dependency between pressure and volume uptake for a brake system damping device 10 with a small volume of medium available for the damping. For simplicity, the volume of the second space 24 in FIG. 1 is assumed here for this characteristic curve 64.

The second characteristic curve 66, which extend above the first characteristic curve 64, shows the dependency of pressure and volume uptake for a brake system damping device 10 with a relatively large volume of medium available for the damping. For simplicity, the combined volume of the second and third space 24, 28 in FIG. 1 is assumed here for the characteristic curve 66.

The vertical dashed line crossing the x axis is used to illustrate a predefined pressure value 68 which forms the upper limit of a pressure range which is of relevance for the pulsation damping in such brake systems. This relevant pressure range thus extends from the coordinate origin to the dashed line.

The horizontal dashed line crossing the y axis is used to illustrate a volume stop 70 for the brake system damping device 10 according to the disclosure. Said volume stop lies approximately at the volume of the second space 24 in FIG. 1.

By means of corresponding configuration of the respective volumes of the second and third space 24, 28, the brake system damping device 10 is adapted to the relevant pressure range and the desired elasticity or damping action in said pressure range. In the case of optimum coordination as illustrated in the diagram of FIG. 4, the dashed lines 68, 70 intersect the characteristic curve 66 at one point.

Figure 5:
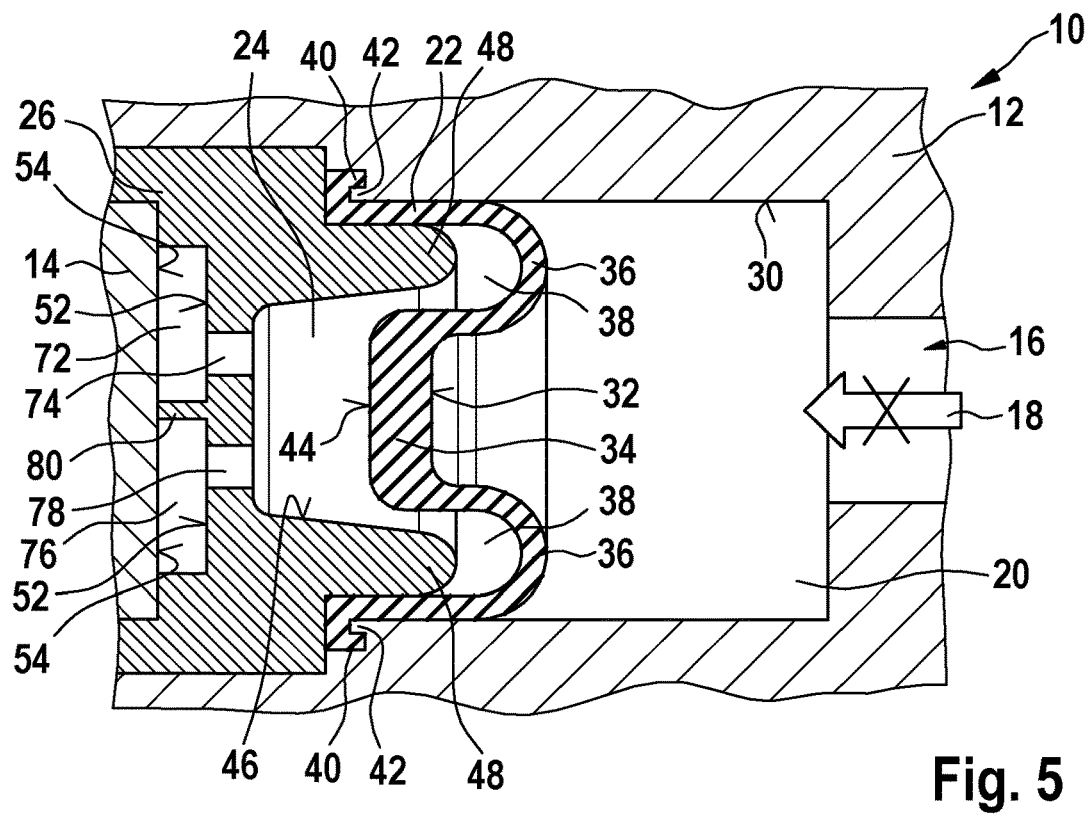
FIG. 5 shows a second example of a brake system damping device of said type.

FIG. 5 illustrates a brake system damping device 10 which differs from that in FIG. 1 only in the region in which the first separating element 22 designed as a rolling diaphragm faces toward by way of the first separating element outer wall 44. The separating element 22 itself and the region that the separating element 22 faces toward by way of the first separating element inner wall 32 correspond entirely to FIG. 1 and will not be described again here.

The main difference in relation to the brake system damping device 10 in FIG. 1 is that, instead of the third space 28 and the associated passage 50 in FIG. 1, the brake system damping device 10 in this case has, in FIG. 5, a first partial space 72 with a passage 74 and a second partial space 76 with a second passage 78. Here, the two partial spaces 72, 76 are separated by means of a separating wall 80. A further difference in relation to FIG. 1 consists in that, here, in FIG. 5, the second separating element 26 extends as far as the housing inner wall 30 and separates the cover 14 therefrom.

All further features correspond to those in FIG. 1. Thus, in this case, too, the second space 24 is surrounded by the first separating element outer wall 44 and by a second separating element inner wall 46 of the second separating element 26. Likewise, the second separating element 26 extends in this case with a diaphragm holding device 48 into the diaphragm fold depression 38 of the separating element 22. Furthermore, the partial spaces 72, 76 adjacent to the separating wall 80 are, like the third space 28 in FIG. 1, surrounded by the second separating element outer wall 52 and a cover inner wall 54 of the cover 14.

The mode of operation is in this case similar to that in the case of the brake system damping device 10 in FIG. 1. If a hydraulic pressure prevails in the first space 20, it is also the case here that the separating element 22 deforms such that the gas volume in the second space 24 decreases in size. Here, the closure element 34 moves into the second space 24 and, above a particular hydraulic pressure, which ideally corresponds to the upper limit of the relevant pressure range, bears against the second separating element 26 and closes the passages 74, 78 to the hse plotted. From As soon as the hydraulic pressure prevailing in the first space 20 decreases, the separating element 22 designed as a rolling diaphragm moves back into its initial state or its initial position again. As a result, the passages 74, 78 are then opened again and connect the partial spaces 72, 76 to the second space 24 again.

Figure 6:
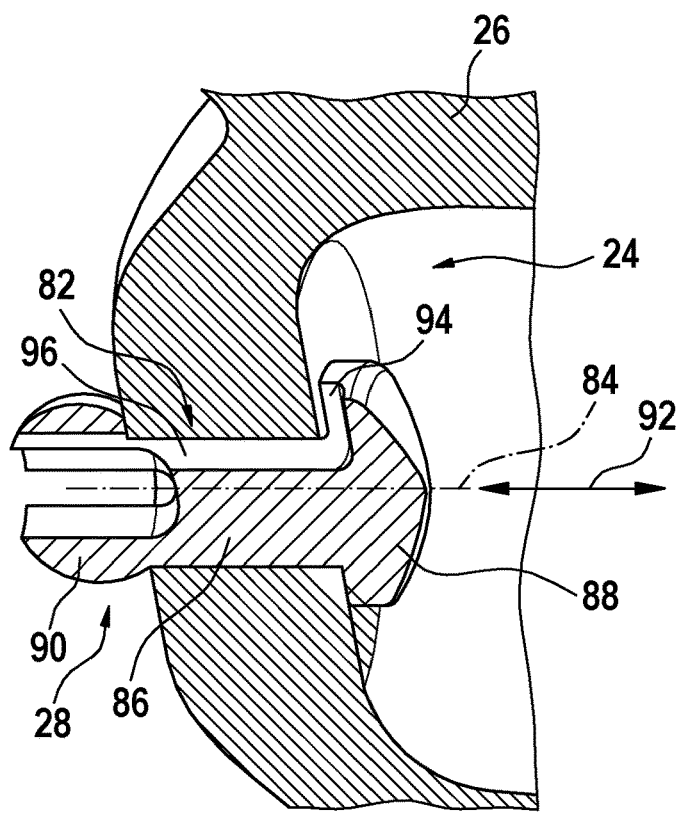
FIG. 6 shows the detail VI as per FIG. 1 with the plug-type element according to the disclosure.
Figure 7:
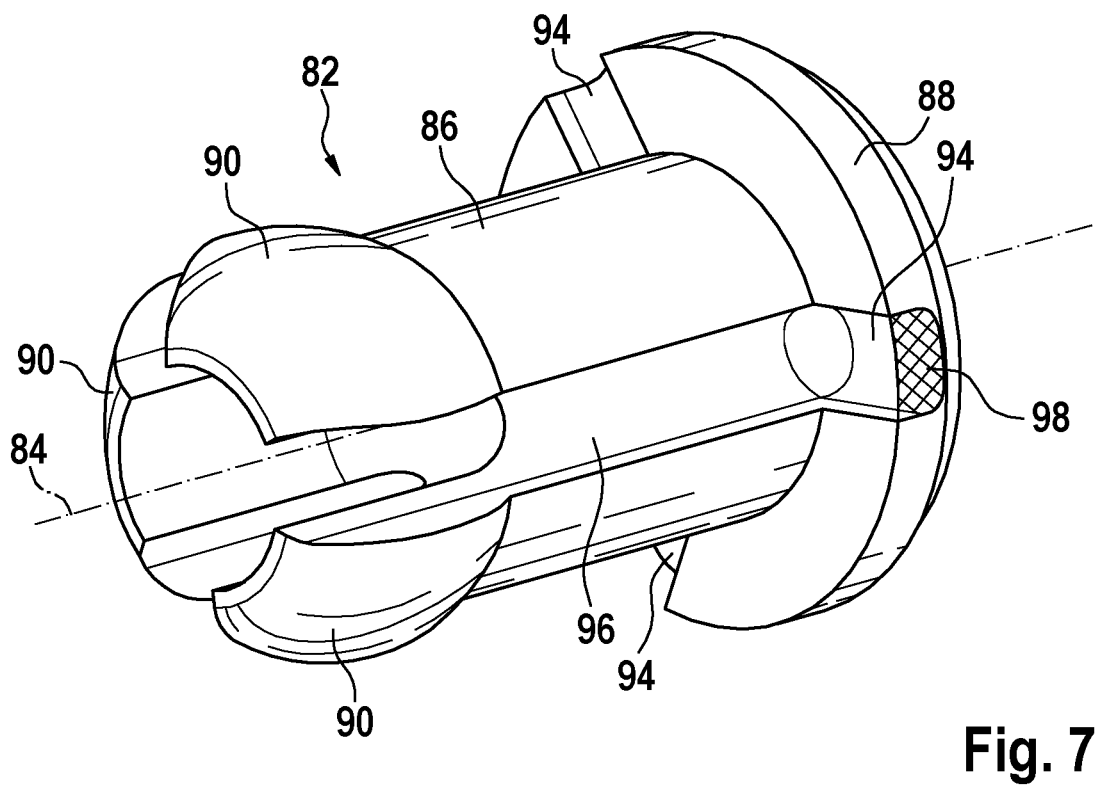
FIG. 7 shows the plug-type element as per FIG. 6 in an enlarged perspective view.

FIGS. 6 and 7 illustrate an exemplary embodiment in which a plug-type element 82 is provided in the passage 50. The plug-type element 82 is mushroom-shaped with a circular cylindrical mushroom stem 86 extending along its longitudinal axis 84 and with a mushroom head 88 formed on said mushroom stem at the side facing toward the second space 24. The diameter of the mushroom stem 86 is slightly smaller than the diameter of the passage 50. The diameter of the mushroom head 88 is larger than the diameter of the passage 50, such that the plug-type element 82 is retained in the passage 50 by means of the mushroom head 88. At the side facing toward the third space 28, the mushroom stem 86 has three detent lugs or detent hooks 90, by means of which said mushroom stem is retained in the passage 50 also on this side of the second separating element 26.

The mushroom head 88 is, on the side facing toward the second space 24, designed as a convex cap against which the first separating element 22 can bear, and be supported, during the movement in the direction of the second separating element 26. The first separating element 22, designed as a diaphragm, in this case cannot enter the passage 50, and cannot therefore be damaged there owing to friction and kinking. Furthermore, with the relatively large area of the convex cap, a large area of action for the fluid entering the second space 24 from the third space 28 through the passage 50 is created, such that, there, the first separating element 22, during the backward movement During said movement, the first separating element 22 is moved with its closure element 34 in a movement direction 92 so as to increase and decrease the size of the second space 24, and in particular so as to open and close the passage 50. The plug-type element 82, at its side facing toward the closure element 34, is now not formed, as would actually be expected and as illustrated in FIGS. 1 to 7, with a passage opening whose cross-sectional area lies transversely with respect to said movement direction 92. Instead, on the plug-type element 82, on the mushroom head 88 thereof, there are provided three passage openings 94, which are individually led, by means of in each case one passage channel 96 along the mushroom stem 86, in fluid-conducting fashion to that side of the plug-type element 82 which faces toward the third space 28.

The passage openings 94 are individually each formed with a cross-sectional area 98, which cross-sectional areas are situated under the central, convex cap in the base region of the cup-shaped separating element inner wall 46 and, here, are oriented substantially in the movement direction 92 of the closure element 34. Here, "substantially" is to be understood to mean that the cross-sectional area 98 extends with its areal plane exactly in the movement direction 92 or at least at an angle of less than 10°, in particular less than 5°, with respect to said movement direction 92.

Here, the individual cross-sectional area 98 has the form of a slot, that is to say has a relatively small slot width in relation to its slot length.

The plug-type element 82, which is relatively complex with regard to its shaping, is in the present case produced from plastic by means of an injection molding process, whereas the second separating element 26, which is relatively simple with regard to its shaping and which has the passage 50, is formed from metal.

What is claimed is:

1. A brake system damping device, comprising:
   a first space configured to have hydraulic pressure applied thereto;
   a second space in which a compressible medium is situated;
   a first separating element configured to separate the first space from the second space;
   a third space in which a compressible medium is situated;
   a second separating element configured to separate the second space from the third space, the second space connected in medium-conducting fashion to the third space by a passage formed in the second separating element;
   a closure element configured to move with the first separating element so as to close the passage in a movement direction as soon as the hydraulic pressure has reached a predefined pressure value in the first space; and
   a plug element arranged in the passage,
   wherein the plug element has a convex cap at a side of the plug element facing toward the second space.

2. A brake system damping device, comprising:
   a first space configured to have hydraulic pressure applied thereto;
   a second space in which a compressible medium is situated;
   a first separating element configured to separate the first space from the second space;

a third space in which a compressible medium is situated;

a second separating element configured to separate the second space from the third space, the second space connected in medium-conducting fashion to the third space by a passage formed in the second separating element;

a closure element configured to move with the first separating element so as to close the passage in a movement direction as soon as the hydraulic pressure has reached a predefined pressure value in the first space; and a plug element arranged in the passage, wherein the plug element is mushroom-shaped and has a mushroom head at a side of the plug element facing toward the second space.

3. A brake system damping device, comprising:

a first space configured to have hydraulic pressure applied thereto;

a second space in which a compressible medium is situated;

a first separating element configured to separate the first space from the second space;

a third space in which a compressible medium is situated;

a second separating element configured to separate the second space from the third space, the second space connected in medium-conducting fashion to the third space by a passage formed in the second separating element;

a closure element configured to move with the first separating element so as to close the passage in a movement direction as soon as the hydraulic pressure has reached a predefined pressure value in the first space; and a plug element arranged in the passage, wherein the plug element defines at least one passage opening at a side of the plug element facing toward the second space, the at least one passage opening having a cross-sectional area that is oriented substantially in the movement direction of the closure element.

4. The brake system damping device according to claim 3, wherein the at least one passage opening is configured as a slot.

5. The brake system damping device according to claim 3, wherein the at least one passage opening is two to four passage openings.

6. A brake system damping device, comprising:

a first space configured to have hydraulic pressure applied thereto;

a second space in which a compressible medium is situated;

a first separating element configured to separate the first space from the second space;

a third space in which a compressible medium is situated;

a second separating element configured to separate the second space from the third space, the second space connected in medium-conducting fashion to the third space by a passage formed in the second separating element;

a closure element configured to move with the first separating element so as to close the passage in a movement direction as soon as the hydraulic pressure has reached a predefined pressure value in the first space; and a plug element arranged in the passage, wherein the plug element has at least one detent hook at a side of the plug element facing toward the third space.

7. The brake system damping device according to claim 1, wherein the second separating element is formed from metal, and wherein the plug element is formed from plastic.

8. The brake system damping device according to claim 1, wherein the first separating element is configured with a diaphragm.

9. The brake system damping device according to claim 1, wherein the first separating element is formed from an elastomer.

10. The brake system damping device according to claim 3, wherein the at least one passage opening is three passage openings.

11. The brake system damping device according to claim 5, wherein the two to four passage openings are spaced circumferentially from one another.

12. The brake system damping device according to claim 8, wherein the diaphragm is a rolling diaphragm.

13. The brake system damping device according to claim 9, wherein the elastomer is ethylene propylene diene monomer.

14. The brake system damping device according to claim 10, wherein the three passage openings are spaced circumferentially from one another.

* * * * *